(12) United States Patent
Nagasaka

(10) Patent No.: US 7,017,180 B1
(45) Date of Patent: Mar. 21, 2006

(54) LOGGED-IN DEVICE AND LOG-IN DEVICE

(75) Inventor: Fumio Nagasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 760 days.

(21) Appl. No.: 09/619,607

(22) Filed: Jul. 19, 2000

(30) Foreign Application Priority Data

Aug. 3, 1999 (JP) .................................. 11-219858

(51) Int. Cl.
G06F 12/14 (2006.01)

(52) U.S. Cl. ............................. 726/3; 710/25; 710/26; 710/27; 710/28; 710/39; 710/100; 710/113; 370/254; 370/326

(58) Field of Classification Search ................ 370/451, 370/454, 455, 461, 254, 326; 713/201; 710/25–28, 710/39, 100, 113, 20
See application file for complete search history.

(56) References Cited

U.S. PATENT DOCUMENTS

| 4,199,661 | A | | 4/1980 | White et al. | |
|---|---|---|---|---|---|
| 4,561,092 | A | * | 12/1985 | Shaver | ........................ 370/448 |
| 4,667,191 | A | * | 5/1987 | Comroe et al. | .......... 340/825.5 |
| 5,293,621 | A | * | 3/1994 | White et al. | ................. 710/107 |
| 5,339,313 | A | * | 8/1994 | Ben-Michael et al. | ...... 370/230 |
| 5,339,427 | A | * | 8/1994 | Elko et al. | ................... 718/103 |
| 5,717,872 | A | | 2/1998 | Whittaker | |
| 5,734,909 | A | | 3/1998 | Bennett | |
| 6,076,115 | A | * | 6/2000 | Sambamurthy et al. | ...... 709/250 |
| 6,243,778 | B1 | * | 6/2001 | Fung et al. | ................. 710/113 |
| 6,430,635 | B1 | * | 8/2002 | Kwon et al. | ................. 710/104 |
| 6,445,718 | B1 | * | 9/2002 | Muto | .......................... 370/474 |
| 6,504,847 | B1 | * | 1/2003 | Horlander | .................... 370/431 |

FOREIGN PATENT DOCUMENTS

| EP | 0 381 325 A2 | 8/1990 |
|---|---|---|
| EP | 0 408 391 A2 | 1/1991 |
| JP | A 8-65320 | 3/1996 |
| JP | A 10-198622 | 7/1998 |

OTHER PUBLICATIONS

IBM Technical Disclosure, Bulletin, Lock Management Architecture, vol. 31, Iss. 5, pp. 125-128, Oct. 1988.*

* cited by examiner

Primary Examiner—Ayaz Sheikh
Assistant Examiner—Taghi T. Arani
(74) Attorney, Agent, or Firm—Oliff & Berridge, PLC

(57) ABSTRACT

A management agent ME1 of a target T1 receives a request of log-in from an initiator of interest and determines whether or not a number of initiators that currently log in the target T1 reaches a predetermined allowable number of simultaneous log-in (steps S210 and S212). In the case of an affirmative answer, the management agent ME1 reads an ordinal number of precedence 'n' allocated to a GUID of the initiator of interest from a queue (step S213) and reads a time constant mapped to the input ordinal number of precedence 'n' from a time constant table (step S214). The management agent ME1 subsequently sends a status packet, which includes a log-in error status and the time constant, to the initiator of interest (step S216). The initiator of interest receives the status packet, reads the time constant included in the input status packet, and outputs another request of log-in to the target T1 at a timing specified by the time constant. This arrangement of the present invention practically ensures that the initiator that outputs the first request of log-in first to the target T1 gains the log-in first.

11 Claims, 8 Drawing Sheets

Fig.6A

| n | GUID |
|---|------|
| 0 |      |
| 1 |      |
| 2 |      |
| 3 |      |
| 4 |      |
| 5 |      |
| 6 |      |
| 7 |      |

Fig.6B

| n | GUID |
|---|------|
| 0 |      |
| 1 | I0   |
| 2 |      |
| 3 |      |
| 4 |      |
| 5 |      |
| 6 |      |
| 7 |      |

Fig.6C

| n | GUID |
|---|------|
| 0 | I0   |
| 1 |      |
| 2 |      |
| 3 |      |
| 4 |      |
| 5 |      |
| 6 |      |
| 7 |      |

Fig.6D

| n | GUID |
|---|------|
| 0 | I0   |
| 1 | I1   |
| 2 |      |
| 3 |      |
| 4 |      |
| 5 |      |
| 6 |      |
| 7 |      |

Fig.6E

| n | GUID |
|---|------|
| 0 | I0   |
| 1 | I1   |
| 2 | I2   |
| 3 |      |
| 4 |      |
| 5 |      |
| 6 |      |
| 7 |      |

Fig.6F

| n | GUID |
|---|------|
| 0 | I0   |
| 1 | I1   |
| 2 | I2   |
| 3 | I3   |
| 4 |      |
| 5 |      |
| 6 |      |
| 7 |      |

Fig.6G

| n | GUID |
|---|------|
| 0 |      |
| 1 | I1   |
| 2 | I2   |
| 3 | I3   |
| 4 |      |
| 5 |      |
| 6 |      |
| 7 |      |

Fig.6H

| n | GUID |
|---|------|
| 0 | I1   |
| 1 | I2   |
| 2 | I3   |
| 3 |      |
| 4 |      |
| 5 |      |
| 6 |      |
| 7 |      |

Fig.7

| n | TIME CONSTANT |
|---|---|
| 1 | t1 |
| 2 | t2(=2t1) |
| 3 | t3(=4t1) |
| 4 | t4(=8t1) |
| 5 | t5(=16t1) |
| 6 | t6(=32t1) |
| 7 | t7(=32t1) |

LOGGED-IN DEVICE AND LOG-IN DEVICE

BACKGROUND OF THE INVENTION

1. Field of the Invention

The present invention relates to a techniques that attains log-in from a plurality of log-in devices to a logged-in device via a predetermined communication path. More specifically the present invention pertains to a technique that is preferably applied in the case of communication between a plurality of devices according to an SBP (serial bus protocol)-2 protocol in a system where the devices are mutually connected via an IEEE 1394 bus.

2. Description of the Related Art

IEEE1394 is a serial bus standard proposed by IEEE and applied for transmission of digital data, and is defined by 'IEEE STD. 1394-1995 IEEE Standard for a High Performance Serial Bus'.

The SBP-2 protocol (hereinafter referred to as the SBP-2) is recommended for standardization by ANSI X3T10 in the United States and is a protocol of a transport layer designed in conformity with the IEEE1394 standard.

In a system where a plurality of devices are mutually connected via an IEEE1394 bus, in the case where the SBP-2 is applied for communication between the devices, the device having a common memory is called an initiator and the device without the common memory is called a target.

The target has at least one logical unit, each providing a service. The initiator requires logging into the logical unit included in the target and establishing a right of using the logical unit that provides the service. In accordance with one concrete procedure, the initiator outputs a request of log-in to the logical unit included in the target and receives a response of accepted log-in from the logical unit.

When the use of the logical unit is concluded, the initiator logs out of the logical unit included in the target and discards the right of using the logical unit. In accordance with one concrete procedure, the initiator outputs a request of log-out to the logical unit included in the target and receives a response of accepted log-out from the logical unit.

A number of initiators that can gain simultaneous log-in (an allowable number of simultaneous log-in) is determined in advance in the design stage with regard to each logical unit included in the target. In the case where the number of initiators that currently log in a certain logical unit included in the target reaches the allowable number of simultaneous log-in preset with regard to the logical unit, the logical unit gives a response of failed log-in to any other initiators that have not yet logged in and currently give a request of log-in.

After receiving the response of failed log-in output from the logical unit, the initiator repeatedly outputs the request of log-in to the logical unit at preset time intervals to gain a response of accepted log-in. When one of the initiators that have logged in the logical unit logs out, the number of initiators that log in the logical unit becomes less than the allowable number of simultaneous log-in. When receiving a next request of log-in from the initiator that repeatedly gives the request of log-in, the logical unit gives a response of accepted log-in to the initiator. The initiator that has repeatedly given the request of log-in accordingly succeeds in logging into the logical unit and establishes a right of using the logical unit.

The following problems, however, arise in the prior art technique. In one example, it is assumed that a first initiator first gives a request of log-in to a certain logical unit included in the target and a second initiator then starts giving a request of log-in to the certain logical unit, while the number of initiators that currently log in the certain logical unit reaches the allowable number of simultaneous log-in. Under such conditions, both the first initiator and the second initiator continue outputting the request of log-in to the certain logical unit at different timings of preset time intervals. When any one of the initiators that have logged in the logical unit logs out, in some cases, the first initiator outputs a next request of log-in at an earlier timing than the second initiator outputs a next request of log-in. In this case, the first initiator that started giving the request of log-in first gains the log-in first. This causes no problem. In other cases, however, the first initiator outputs a next request of log-in at a later timing than the second initiator outputs a next request of log-in. In this case, the second initiator that started giving the request of log-in later gains the log-in prior to the first initiator.

When other initiators start giving the request of log-in, in addition to the second initiator, these initiators may log into the logical unit prior to the first initiator. In this case, it takes an undesirably long time for the first initiator to log into the logical unit and establish a right of using the logical unit.

SUMMARY OF THE INVENTION

The object of the present invention is thus to provide a technique that practically ensures that an initiator, which starts outputting a request of log-in first to a target, gains a log-in first.

At least part of the above and the other related objects is attained by a logged-in device that is logged in by a plurality of specific devices via a predetermined communication path. The logged-in device includes: a response unit that gives a response of failed log-in to one specific device of interest, which has just output a request of log-in, when a number of specific devices that currently log in the logged-in device reaches a predetermined allowable number of simultaneous log-in; and a re-request timing specification unit that specifies a timing of re-request of log-in to determine a time when the specific device of interest, which has just output the request of log-in and received the response of failed log-in, should output another request of log-in.

In the logged-in device of the present invention, in the case where the number of specific devices that currently log in the logged-in device reaches a predetermined allowable number of simultaneous log-in, the response unit gives the response of failed log-in to the specific device of interest, which has just output the request of log-in. The re-request timing specification unit then specifies the timing of re-request of log-in to determine the time when the specific device of interest, which has just received the response of failed log-in, should output another request of log-in.

In the logged-in device of the present invention, the re-request timing specification unit may assign different timings of re-request of log-in to the specific devices that wait for the log-in. The timing of re-request of log-in is thus specified to enable the specific device of interest, which outputted the request of log-in first, to gain the log-in first. This arrangement practically ensures that the specific device that started outputting the request of log-in first to the logged-in device gains the log-in first.

In the specification hereof, the log-in is a process of establishing a right of using the logged-in device.

In accordance with one preferable application of the logged-in device, the re-request timing specification unit includes: a precedence designation unit that allocates an ordinal number of precedence to the specific device of interest, which has just output the request of log-in; and a re-request timing determination unit that determines the timing of re-request of log-in with regard to the specific device of interest, based on the ordinal number of precedence allocated to the specific device of interest.

This arrangement enables the timing of re-request of log-in to be specified corresponding to the ordinal number of precedence allocated to each of the specific devices that wait for the log-in.

In accordance with another preferable application of the present invention, the logged-in device includes at least one logical unit, which is independently logged in by each of the plurality of specific devices. The response unit gives a response of failed log-in with regard to a certain logical unit to one specific device of interest, which has just output a request of log-in to the certain logical unit, when a number of specific devices that currently log in the certain logical unit reaches an allowable number of simultaneous log-in preset for the certain logical unit. The re-request timing specification unit specifies a timing of re-request of log-in to determine a time when the specific device of interest, which has just output the request of log-in to the certain logical unit and received the response of failed log-in, should output another request of log-in to the certain logical unit.

In the structure that the logged-in device includes one or more logical units that are independently logged in, this arrangement enables the timing of re-request of log-in, at which the specific device should output another request of log-in, to be specified with regard to each logical unit.

The present invention is also directed to a log-in device that logs in a specific device via a predetermined communication path. The log-in device includes a log-in request unit that outputs a request of log-in to the specific device and, when receiving a response of failed log-in and a specification of a timing of re-request from the specific device, outputs another request of log-in to the specific device at the specified timing of re-request.

In the log-in device of the present invention, the log-in request unit outputs the request of log-in again to the specific device at the timing of re-request of log-in specified by the specific device. The timing of re-request of log-in may be specified to enable the specific device, which outputted the request of log-in first, to gain the log-in first. This arrangement practically ensures that the specific device that started outputting the request of log-in first to the logged-in device gains the log-in first.

The present invention is further directed to an inter-device communication system, where a logged-in device is logged in by a plurality of log-in devices via a predetermined communication path. The logged-in device includes: a response unit that gives a response of failed log-in to one log-in device of interest, which has just output a request of log-in, when a number of log-in devices that currently log in the logged-in device reaches a predetermined allowable number of simultaneous log-in; and a re-request timing specification unit that specifies a timing of re-request of log-in to determine a time when the log-in device of interest, which has just output the request of log-in and received the response of failed log-in, should output another request of log-in. Each of the plurality of log-in devices includes a log-in request unit that outputs the request of log-in to the logged-in device and, when receiving the response of failed log-in and the specification of the timing of re-request from the logged-in device, outputs another request of log-in to the logged-in device at the specified timing of re-request.

The inter-device communication system of the present invention practically ensures that the log-in device, which started outputting the request of log-in first to the logged-in device, gains the log-in first.

The present invention is also directed to a method of controlling log-in, so as to enable a plurality of log-in devices to log in at least one logical unit included in a logged-in device via a predetermined communication path. The method includes the steps of: (a) causing the logged-in device to give a response of failed log-in with regard to a certain logical unit to one log-in device of interest, which has just output a request of log-in to the certain logical unit, when a number of log-in devices that currently log in the certain logical unit reaches an allowable number of simultaneous log-in preset for the certain logical unit; (b) causing the logged-in device to specify a timing of re-request of log-in to determine a time when the log-in device of interest, which has just output the request of log-in to the certain logical unit and received the response of failed log-in, should output another request of log-in to the certain logical unit; and (c) causing the log-in device of interest to output another request of log-in to the certain logical unit included in the logged-in device at the specified timing of re-request when the log-in device of interest receives the response of failed log-in with regard to the certain logical unit and the specification of the timing of re-request from the logged-in device.

In the method of the present invention, the logged-in device may assign different timings of re-request of log-in to the log-in devices that wait for the log-in. The timing of re-request of log-in is thus specified to enable the log-in device of interest, which outputted the request of log-in first, to gain the log-in first. This arrangement practically ensures that the log-in device that started outputting the request of log-in first to the logged-in device gains the log-in first.

In accordance with one preferable application of the method, the step (b) includes the step of causing the logged-in device to allocate ordinal numbers of precedence to the plurality of log-in devices in a sequence of outputting first requests of log-in to the certain logical unit, and to assign a shorter timing of re-request of log-in to a log-in device having a higher ordinal number of precedence.

This arrangement causes the log-in device of interest that outputted the first request of log-in first to have the higher ordinal number of precedence and the shorter timing of re-request of log-in. Compared with the other log-in devices, the log-in device of interest, which outputted the first request of log-in first, outputs another request of log-in at the shortest timing of re-request and thereby outputs a greatest number of requests of log-in per unit time. In the event that one of the log-in devices that have gained the log-in logs out, there is a good chance that the log-in device of interest outputs the next request of log-in first and gains the log-in first.

The present invention is further directed to a first computer program product that causes a computer to carry out a series of logged-in processing, the computer being logged in by a plurality of specific devices via a predetermined communication path. The first computer program product includes: a first program code that causes the computer to give a response of failed log-in to one specific device of interest, which has just output a request of log-in, when a number of specific devices that currently log in the logged-in device reaches a predetermined allowable number of simultaneous log-in; a second program code that causes the computer to specify a timing of re-request of log-in to determine a time when the specific device of interest, which has just output the request of log-in and received the response of failed log-in, should output another request of log-in; and a computer readable medium, in which the first program code and the second program code are stored.

In the specification hereof, the computer may be any of personal computers, mobile computers, information processing terminals, works stations, a variety of other computers, a diversity of peripheral equipment that practically have the functions of the computer, such as printers, copying machines, and interface switching devices, and a variety of domestic and business equipment that practically have the functions of the computer, such as audio equipment and video equipment. In the embodiment discussed later, however, the term 'computer' may be used in a narrower sense and represent a personal computer or another equivalent computer.

The computer executes the first and the second program codes to actualize the functions similar to those of the response unit and the re-request timing specification unit included in the logged-in device of the present invention. The first computer program product accordingly exerts the same effects as those of the logged-in device discussed above.

In accordance with one preferable application of the first computer program product, the second program code includes a program code that causes the computer to allocate ordinal numbers of precedence to the plurality of specific devices in a sequence of outputting first requests of log-in, and to assign a shorter timing of re-request of log-in to a specific device having a higher ordinal number of precedence.

This arrangement causes the specific device of interest, which outputted the first request of log-in first, to output another request of log-in at the shortest timing of re-request and thereby output a greatest number of requests of log-in per unit time. In the event that one of the specific devices that have gained the log-in logs out, there is a good chance that the specific device of interest outputs the next request of log-in first and gains the log-in first.

The present invention is further directed to a second computer program product that causes a computer to carry out a series of log-in processing, the computer logging in a specific device via a predetermined communication path. The second computer program product includes: a program code that causes the computer to output a request of log-in to the specific device and, when receiving a response of failed log-in and a specification of a timing of re-request from the specific device, output another request of log-in to the specific device at the specified timing of re-request; and a computer readable medium, in which the program code is stored.

The computer executes the program code to actualize the functions similar to those of the log-in request unit included in the log-in device of the present invention. The second computer program product accordingly exerts the same effects as those of the log-in device discussed above.

The principle of the present invention may be attained by a variety of applications, for example, the logged-in device, the log-in device, the inter-device communication system, and the method of controlling the log-in discussed above, as well as computer programs that construct any of such devices, recording media in which the computer programs are recorded, and data signals that include the computer programs and are embodied in carriers.

These and other objects, features, aspects, and advantages of the present invention will become more apparent from the following detailed description of the preferred embodiment with the accompanying drawings.

BRIEF DESCRIPTION OF THE DRAWINGS

FIGS. 6A through 6H show an exemplified queue included in a management agent ME1;

FIG. 7 shows an exemplified time constant table included in the management agent ME1.

DESCRIPTION OF THE PREFERRED EMBODIMENTS

Figure 1:
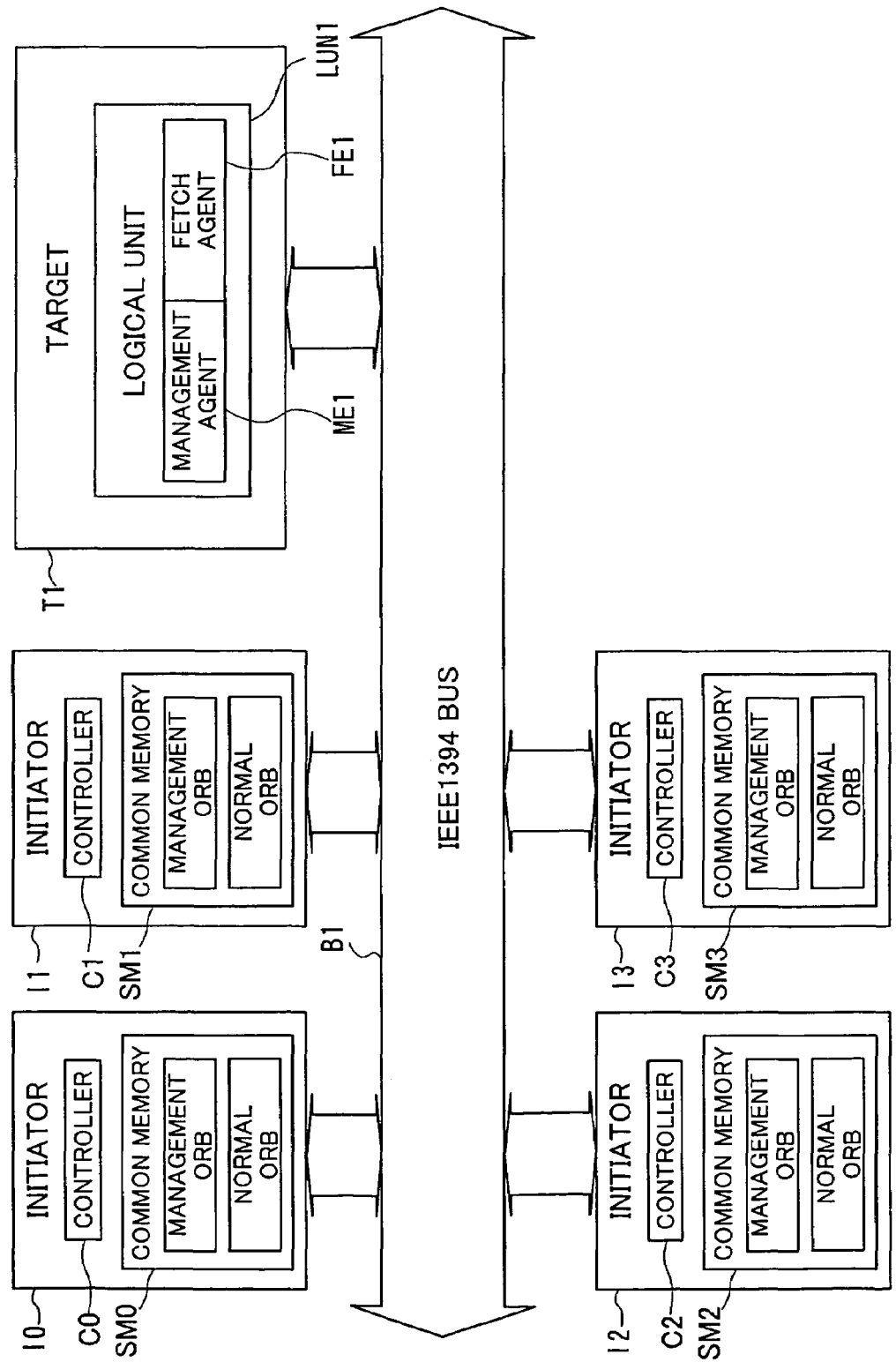
FIG. 1 is a block diagram illustrating an inter-device communication system in one embodiment according to the present invention.

One mode of carrying out the present invention is described below as a preferred embodiment of the present invention. Prior to the description of the embodiment, the outlines of an IEEE1394 bus and an SBP-2 are explained.

(A) Outlines of IEEE1394 bus and SBP-2

The IEEE 1394 bus is obtained by serializing processor buses having an address space of 64 bits on an identical signal line. The transfer speed of the IEEE1394 bus is 400 MHz so far, but is expected in future to rise to 3.2 GHz at the maximum. The IEEE1394 bus is basically similar to conventional processor buses used on a mother board of a computer, but supports a massive memory space by a single signal line.

The IEEE1394 bus is not used exclusively for one processor but connects a plurality of processors with one another. This is equivalent to allocation of the memory space occupied by one bus into the plurality of processors. The plurality of processors commonly use one signal path. This attains a situation very similar to a network.

A plurality of computers can be connected to one IEEE1394 bus. Further connection of a printer to the IEEE1394 bus enables the plurality of computers to share the printer. This is regarded as a small-sized network.

Unlike the general network, however, the IEEE1394 bus follows the design of the processor buses and basically enables management of requests output from the respective processors without any collision. This mechanism is called bus arbitration. On the IEEE1394 bus during data transfer, the bus arbitration allows only one node (in this case, one computer) to execute the data transfer. In other words, when a certain node occupies the IEEE1394 bus, the control prohibits the other nodes from using the bus in the same cycle time (125 ems). The IEEE1394 bus accordingly does not require the technique of exclusive resource control applied in the general network, for example, detection of carriers or detection of collisions (collisions of packets). Since the IEEE1394 bus does not carry out the detection of collisions, an upper-layer protocol or an application program should be in charge of competition of resources.

The SBP-2 is, on the other hand, designed on a connection basis. Namely a host device that demands the use of a certain target of the SBP-2 should be designed as an initiator of the SBP-2. The initiator gives a request of log-in to the target and establishes a right of using the target only in the case of accepted log-in. More precisely the initiator requires a log-in with regard to each logical unit included in the target. For the clarity of explanation, however, it is assumed that the initiator simply gives a request of log-in to the target. Even if there is only one target corresponding to a plurality of initiators, only the initiator with the accepted log-in can utilize the target at the moment. This arrangement enables the plurality of initiators to share the target.

The specification of the SBP-2 does not prohibit a plurality of initiators from logging into one target. The simultaneous log-in by the plurality of initiators may thus be allowed as long as the target is designed to accept the simultaneous log-in. The number of initiators that can gain simultaneous log-in, that is, the allowable number of simultaneous log-in, is specified at the design stage of the target according to the limitations of the design. In some cases, while a specific target has the allowable number of simultaneous log-in equal to N, M initiators (where M is greater than N) gives the request of log-in to the specific target. In these cases, the target accepts the log-in up to the N initiators but rejects any subsequent requests of log-in unless the number of initiators that gain the simultaneous log-in becomes less than N, that is, unless any one of the initiators that have gained the log-in logs out.

In the SBP-2, the initiators are connected with the targets via the IEEE1394 bus. The IEEE1394 bus enables the targets to read and write data from and into the memories of the initiators. As mentioned previously, in the SPB-2, the devices having common memories are called the initiators, while the devices without the common memory are called the targets. It is unnecessary that both the initiators and the targets have common memories. Namely it is sufficient that only the initiators have common memories. Each of the initiators has a common memory as part of its own memory and accordingly enables data to be read and written by the local access. Each of the targets, on the other hand, uses part of the memory owned by the initiator as the common memory and is required to read and write data by the remote access. The roles of the respective devices as the initiators and the targets are determined at the initial stage of the design process. In general, the host devices, such as the computers, are defined as the initiators, and the devices, such as the printer and the scanner, are defined as the targets. These roles are fixed and are not changed in principle, although some design may allow the role of one device to be changed over between the target and the initiator, for example, with a switch.

When the initiator logs into the target, the following transaction proceeds in the SBP-2.

The initiator first provides a special data structure called ORB (operation request block) on its own common memory and keeps the data, which are to be given to the target, in the ORB. In one example, the initiator is a computer and the target is a printer. In this case, the computer functioning as the initiator keeps the image data, which are to be printed by the printer functioning as the target, in a specific part of the common memory space and stores an address pointer, which represents the specific part, at a predetermined position in the ORB. This arrangement enables the initiator to carry out the required processing at the highest possible speed, regardless of the state of the target. The target, on the other hand, successively takes in the ORBs, which are placed on the common memory of the initiator, and works to process the contents in the ORBs. The printer functioning as the target takes in and processes a next set of image data immediately after the printer has completed printing a certain set of image data to provide some vacancy in its own memory. The printer accordingly continues printing without any rest and processes the jobs at the highest possible efficiency.

The conventional network carries out the push-type control, where the initiator polls the state of the target and sends a command when the target is ready for the acceptance of the request. The SBP-2, on the other hand, carries out the pull-type control, where the initiator keeps a command and data, which are to be given to the target, in its own memory space and the target takes in the command and the data for the processing at its convenient timing that ensures the processing. This arrangement of the SBP-2 enhances the total efficiency of the transaction.

(B) Structure of Embodiment

Based on such knowledge, one embodiment of the present invention is described with the drawing of FIG. 1. FIG. 1 is a block diagram illustrating an inter-device communication system including a plurality of initiators and a target in the embodiment of the present invention. In the inter-device communication system of FIG. 1, the respective devices are connected via an IEEE1394 bus B1 and communicate according to the SBP-2 protocol. The devices connected to the IEEE1394 bus B1 include initiators I0 through I3 having common memories and a target T1 without the common memory. In this embodiment, the initiators I0 through I3 are computers, and the target T1 is a printer.

The initiators I0 through I3 respectively have controllers C0 through C3 and common memories SM0 through SM3.

The target T1 has one logical unit LUN1. As discussed previously, the initiator can gain the log-in for each logical unit included in the target. In this embodiment, the target T1 has only one logical unit LUN1, so that the initiators I0 through I3 can gain the log-in only for this logical unit LUN1 of the target T1.

As discussed above, each logical unit included in the target has the preset number of initiators that can gain simultaneous log-in, that is, the allowable number of simultaneous log-in, which is determined in the design stage. For the simplicity of explanation, the logical unit LUN1 included in the target T1 has the allowable number of simultaneous log-in equal to '1'. After accepting the log-in of any one of the initiators, the logical unit LUN1 rejects any subsequent requests of log-in.

The logical unit LUN1 included in the target T1 has a management agent ME1 that receives a request of log-in or log-out from the initiator and gives an appropriate response to the initiator, and a fetch agent FE1 that transmits data to and from the initiator, which has gained the log-in.

Figure 2:
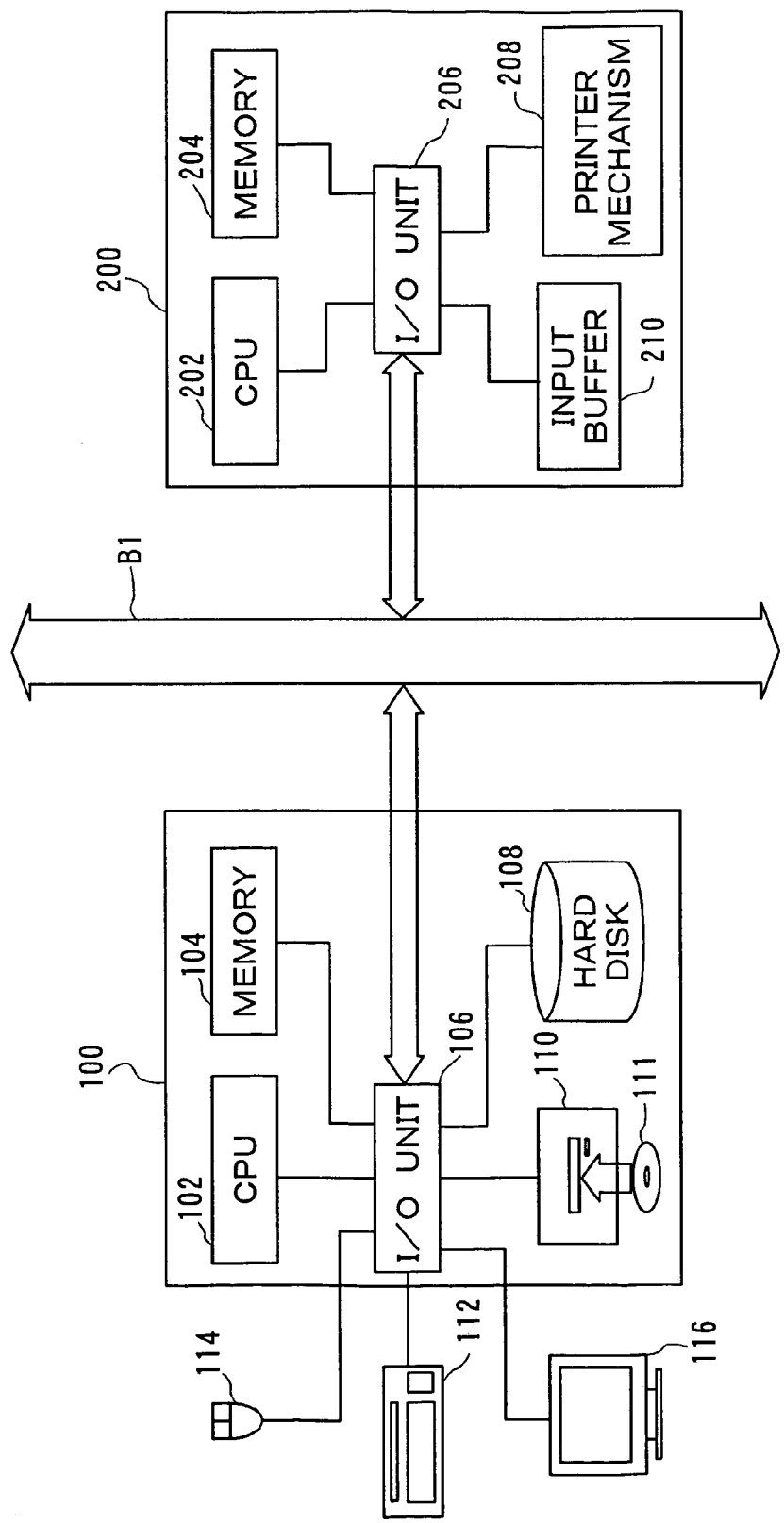
FIG. 2 is a block diagram showing the hardware structure of a computer and a printer respectively functioning as the initiator and the target shown in FIG. 1.

FIG. 2 is a block diagram illustrating the hardware structure of a computer and a printer respectively functioning as the initiator and the target shown in FIG. 1.

As shown in FIG. 2, the computer 100 functioning as the initiator includes a CPU 102 that executes a diversity of processes and controls according to computer programs, and a memory 104, in which the computer programs are stored and data obtained in the course of the processing are temporarily registered. The computer 100 further includes an I/O unit 106 that is in charge of data transmission between the CPU 102 and the variety of peripheral devices and the IEEE1394 bus B1, a hard disk 108, in which a diversity of data are stored, and a CD-ROM drive 110. A keyboard 112 and a mouse 114 used for inputting user's instructions and a monitor 116 used for displaying data are connected externally to the computer 100.

The CPU 102 reads and executes a desired computer program stored in the memory 104, thereby functioning as the controller shown in FIG. 1. A part of the memory 104 is allocated to the common memory shown in FIG. 1.

The printer 200 functioning as the target includes a CPU 202 that executes a diversity of processes and controls according to computer programs, and a memory 204, in which the computer programs are stored and data obtained in the course of the processing are temporarily registered. The printer 200 further includes an I/O unit 206 that is in charge of data transmission between the CPU 202 and the variety of peripheral devices and the IEEE1394 bus B1, a printer mechanism 208 that carries out a printing operation to print an image on printing paper in response to an instruction from the CPU 202, and an input buffer 210, in which print data are temporarily registered.

The CPU 202 reads and executes a desired computer program stored in the memory 204, thereby functioning as the logical unit shown in FIG. 1.

In this embodiment, the computer programs stored in the memory 104 of the computer 100 are provided in the form of being recorded in a CD-ROM 111 as a recording medium and read by the CD-ROM drive 110 to be taken into the computer 100. The input computer programs are transferred to the hard disk 108 and further transferred to the memory 104 according to the requirements, for example, at the time of activation. The input computer programs may alternatively be transferred to the memory 104 not via the hard disk 108 but directly.

In the printer 200, on the other hand, a part of the memory 204 is constructed as a ROM. The computer programs for the printer 200 are stored in the ROM and provided in the form of being recorded in the ROM chip. The part of the memory 104 may alternatively be constructed as a rewritable non-volatile memory, instead of the ROM. In this alternative structure, the computer programs for the printer 200 are provided in the form of being recorded in the CD-ROM 111. The computer programs are read by the CD-ROM drive 110 of the computer 100 and transferred to the printer 200 via a network (not shown) to be written into the non-volatile memory.

In this embodiment, the CD-ROM and the ROM are used as the recording media, in which the computer programs are recorded in a computer readable manner. Other examples of the available recording medium include flexible disks, magneto-optic discs, IC cards, ROM cartridges, punched cards, prints with barcodes or other codes printed thereon, internal storage devices (memories like a RAM) and external storage devices of the computer, and a diversity of other computer readable media.

The computer programs may otherwise be taken into the computer 100 or the printer 200 from a program server (not shown) that is accessed via a network and works as a supplier of computer programs.

Part of the computer programs may be incorporated in the operating system.

(C) Operation of Embodiment

The operation of the embodiment is discussed below with referring to FIGS. 3 through 5.

Figure 3:
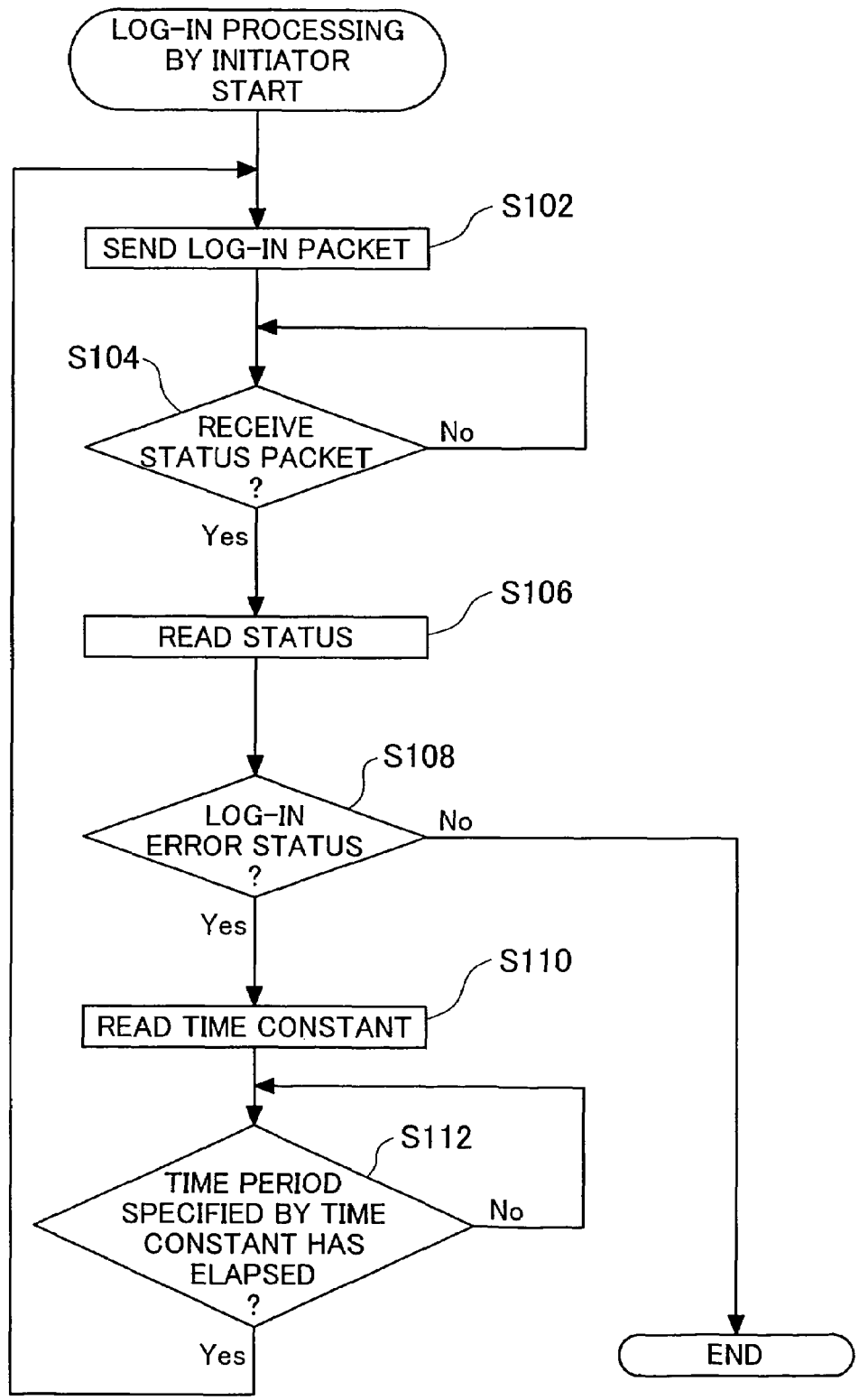
FIG. 3 is a flowchart showing a processing routine of log-in executed by any one of the initiators shown in FIG. 1.

FIG. 3 is a flowchart showing a processing routine of log-in executed by any one of the initiators shown in FIG. 1. FIG. 4 is a flowchart showing a processing routine of log-in executed by the target shown in FIG. 1. FIG. 5 is a timing chart showing transmission of requests and responses between the respective initiators and the target shown in FIG. 1. The ordinate in FIG. 5 denotes the time axis. The respective columns from the left to the right represent the timings of transmission of requests and responses at the initiator I0, the target T1, the initiator I1, the initiator I2, and the initiator I3.

The respective initiators I0 through I3 and the target T1 are connected via the IEEE1394 bus B1. According to the bus arbitration discussed above, while one initiator selected among the initiators I0 through I3 sends a request to the target T1, the IEEE1394 bus B1 is occupied by the selected initiator. The other initiators are thus prohibited from sending the requests simultaneously.

Figure 5:
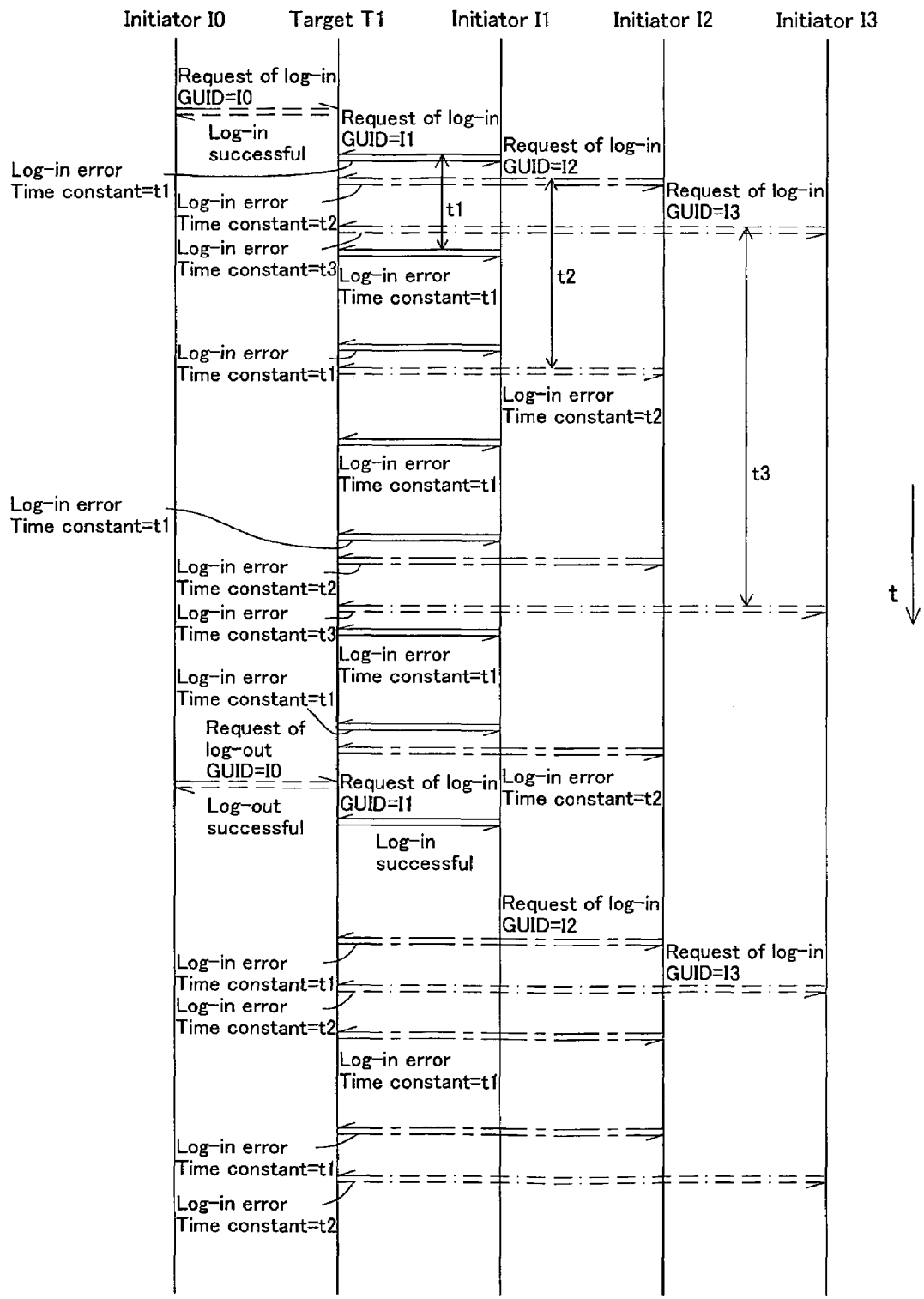
FIG. 5 is a timing chart showing transmission of requests and responses between the respective initiators and the target shown in FIG. 1.

In the example of FIG. 5, the initiator I0 first gives a request of log-in to the target T1. The controller C0 of the initiator I0 then sends a log-in packet to the target T1 at step S102 in the flowchart of FIG. 3. The log-in packet includes a request of log-in for requiring the target T1 to accept a log-in and a GUID of the initiator I0. The GUID here stands for the Global Unique Identification and represents an identification code that is intrinsic to each of the initiators and the targets. The GUID is allocated as a unique identification code only one in the world to each device constructed as the initiator or the target in its design stage. In this embodiment, the initiator I0 has the GUID 'I0'. Similarly the initiators I1, I2, and I3 respectively have the GUIDs 'I1', 'I2', and 'I3'. The GUID included in the log-in packet sent from the initiator I0 is accordingly 'I0' as shown in FIG. 5.

Figure 4:
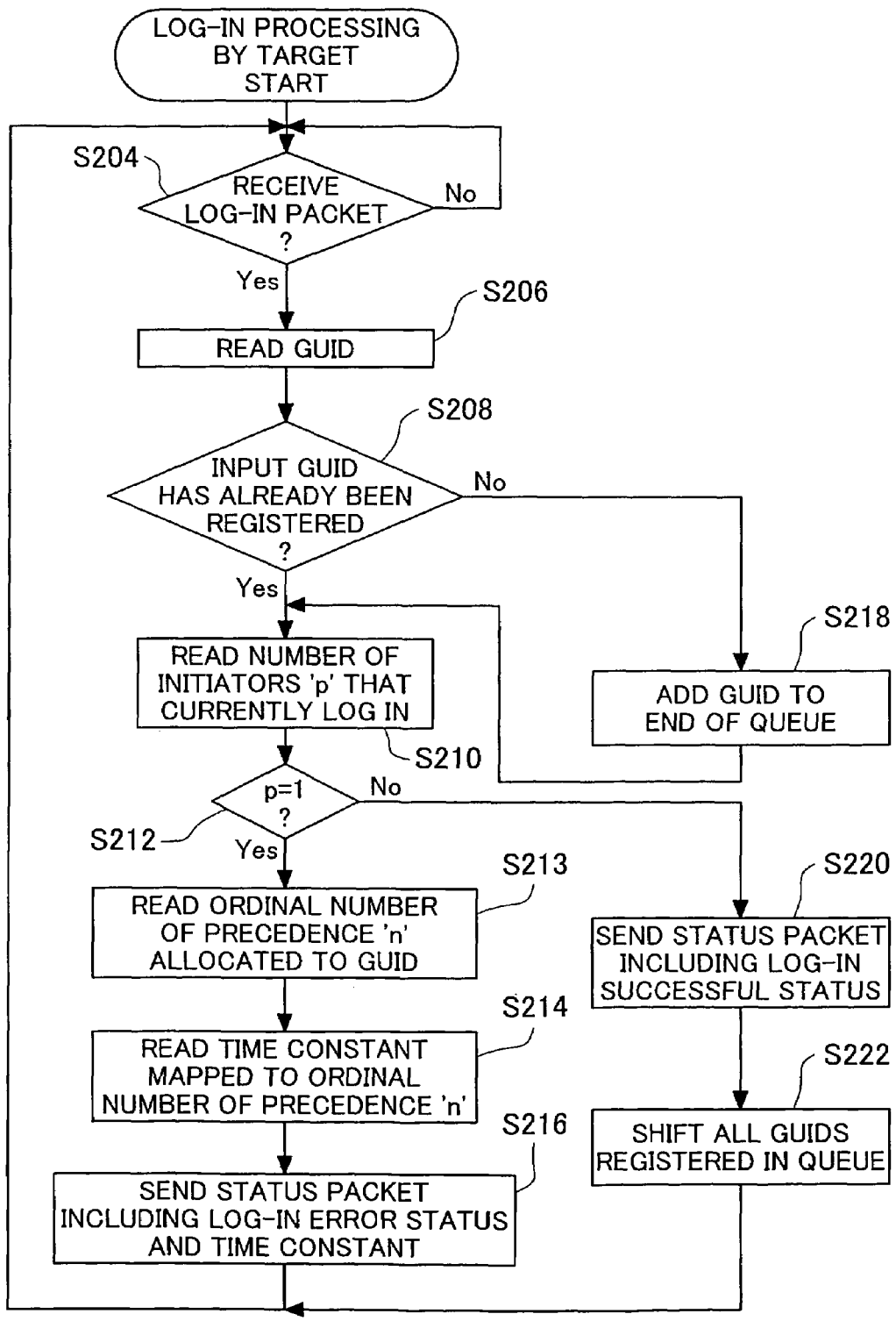
FIG. 4 is a flowchart showing a processing routine of log-in executed by the target shown in FIG. 1.

Referring to the flowchart of FIG. 4, in the meantime, the management agent ME1 of the target T1 stands by for the input of a log-in packet at step S204. When receiving a packet, the management agent ME1 determines whether or not the input packet includes a request of log-in. In the case where the request of log-in is included in the input packet, the management agent ME1 identifies the input packet as a log-in packet and proceeds to the processing of step S206.

At step S206, the management agent ME1 reads the GUID included in the input log-in packet. As mentioned previously, when the management agent ME1 receives the log-in packet sent from the initiator I0, the read GUID is 'I0'. Based on the read GUID, the management agent ME1 determines that the input log-in packet has been sent from the initiator I0.

The management agent ME1 has a queue, in which the GUIDs of the initiators that output the request of log-in are registered. FIG. 6 shows an exemplified queue included in the management agent ME1. FIGS. 6A through 6H correspond to the time series in the timing chart shown in FIG. 5.

The GUIDs of the initiators are registered at addresses n=1 through 7 of the queue shown in FIG. 6A in a sequence of receiving the first request of log-in from the respective initiators. The addresses n=1 through 7 accordingly represent the order of receiving the first request of log-in from the respective initiators. In the embodiment, this is regarded as the order of precedence of the initiators. The GUID of the initiator that has logged in the logical unit LUN1 is registered at the address n=0. In this example, the logical unit LUN1 has the allowable number of simultaneous log-in set equal to '1' as mentioned previously. The number of initiators that can gain the simultaneous log-in is accordingly only one. Only one address n=0 is thus allocated to the initiator that has logged in the logical unit LUN1.

The management agent ME1 determines whether or not the GUID read at step S206 has already been registered in the queue at step S208. At this moment, the request of log-in from the initiator I0 is the first request of log-in. The read GUID 'I0' has thus not been registered yet in the queue as shown in FIG. 6A. The program accordingly proceeds to the processing of step S218.

The management agent ME1 adds the read GUID to the current end of the queue at step S218. At this moment, there is no registration at the addresses n=1 through 7 in the queue. The management agent ME1 accordingly registers the currently read GUID 'I0' at the address n=1 in the queue as shown in FIG. 6B.

The management agent ME1 then reads a number of initiators 'p' that currently log in the logical unit LUN1 at step S210. As described previously, when any one of the initiators logs in the logical unit LUN1, the GUID of the initiator is registered at the address n=0 in the queue. The management agent ME1 accordingly checks the address n=0 at step S210. When there is registration of any GUID at the address n=0, the number of initiators 'p' that currently log in is set equal to '1'. When there is no registration at the address n=0, on the contrary, the number of initiators 'p' is set equal to '0'. At this moment, no GUID has yet been registered at the address n=0 in the queue, so that the number of initiators 'p' set equal to '0' is read at step S210.

At subsequent step S212, the management agent ME1 compares the input number of initiators 'p' with the predetermined allowable number of simultaneous log-in of the logical unit LUT1, which is set equal to '1'. Namely the management agent ME1 determines whether or not the number of initiators 'p' that currently log in the logical unit LUN1 reaches the allowable number of simultaneous log-in '1' of the logical unit LUN1.

In the case where the number of initiators 'p' that currently log in reaches the allowable number of simultaneous log-in '1', the logical unit LUN1 can no longer accept the log-in of any initiators. The program accordingly proceeds to the processing of and after step S213, which will be discussed later.

In the case where the number of initiators 'p' that currently log in does not reach the allowable number of simultaneous log-in '1', on the other hand, the logical unit LUN1 can accept the log-in of the initiator that has just given the request of log-in. The program accordingly proceeds to the processing of and after step S220.

As shown in FIG. 5, the management agent ME1 sends a status packet, which is set to a log-in successful status, to the initiator I0 that has just given the request of log-in at step S220. The log-in successful status represents a response of accepted log-in.

The management agent ME1 then shifts all the GUIDs registered in the queue at step S222. In this example, the GUID registered in the queue is only the GUID of the initiator I0 registered at the address n=1 as shown in FIG. 6B. The GUID of the initiator I0 is accordingly shifted to the address n=0, which represents the log-in state, as shown in FIG. 6C.

After completion of the processing at step S222, the management agent ME1 again stands by for the input of another log-in packet at step S204.

Referring back to the flowchart of FIG. 3, the controller C0 of the initiator I0 stands by for the input of the status packet at step S104, after sending the log-in packet at step S102. When receiving the status packet from the target T1, the controller C0 reads the status specified in the status packet at step S106.

The controller C0 then determines whether or not the input status is a log-in error status, which represents failed log-in, at step S108. When the input status is the log-in error status, the log-in is failed. The controller C0 accordingly executes the processing of and after step S110, in order to give another request of log-in to the target T1. The processing of and after step S110 will be discussed later.

When the input status is not the log-in error status but the log-in successful status, on the other hand, the log-in is accepted. The controller C0 accordingly concludes the series of the log-in processing shown in the flowchart of FIG. 3.

When the initiator I0 logs in the logical unit LUN1 of the target T1 by the above procedure, the controller C0 of the initiator I0 starts actual transmission of data to and from the fetch agent FE1 of the target T1.

In the example shown in FIG. 5, after the initiator I0 has managed to log in the logical unit LUN1 of the target T1, another initiator I1 gives a request of log-in to the target T1. The series of the processing then proceeds in the following manner.

The controller C1 of the initiator I1 first sends a log-in packet, which includes a request of log-in and the GUID of the initiator I1, to the target T1 at step S102 in the flowchart of FIG. 3. In this case, the GUID included in the log-in packet is 'I1' as shown in FIG. 5.

Referring again to the flowchart of FIG. 4, the management agent ME1 receives the log-in packet and reads the GUID included in the input log-in packet at step S206. Based on the read GUID 'I1', the management agent ME1 determines that the input log-in packet is sent from the initiator I1.

The management agent ME1 then determines whether or not the read GUID has already been registered in the queue at step S208. At this mom ent, the request of log-in from the initiator I1 is the first request of log-in, so that the read GUID 'I1' has not yet been registered in the queue as shown in FIG. 6C. The management agent ME1 accordingly adds the read GUID to the current end of the queue at step S218. At this moment, the GUID 'I0' of the initiator I0 is registered at the address n=0 in the queue, but there is no registration at the addresses n=1 through 7. The management agent ME1 accordingly registers the currently read GUID 'I1' at the address n=1 as shown in FIG. 6D.

The management agent ME1 subsequently reads the number of initiators 'p' that currently log in the logical unit LUN1 at step S210. At this moment, the GUID of the initiator I0 has already been registered at the address n=0 in the queue as shown in FIG. 6D. The number of initiators 'p' set equal to '1' is accordingly read at step S210.

The management agent ME1 then compares the input number of initiators 'p' with the allowable number of simultaneous log-in '1' at step S212. In this case, the number of initiators 'p' is set equal to '1' and equal to the allowable number of simultaneous log-in '1'. The management agent ME1 thus determines that the number of initiators 'p' that has already logged in the logical unit LUN1 reaches the allowable number of simultaneous log-in '1' and that the logical unit LUN1 does not further allow the log-in of any initiators. The program accordingly proceeds to the processing of and after step S213.

The management agent ME1 reads an ordinal number of precedence 'n' allocated to the GUID of the initiator of interest at step S213. At this moment, the GUID of the initiator of interest, that is, the initiator I1, is registered at the address n=1 in the queue as shown in FIG. 6D. Since the GUID has the allocated ordinal number of precedence '1', the management agent ME1 reads the ordinal number of precedence '1' at step S213.

At subsequent step S214, the management agent ME1 reads a time constant mapped to the ordinal number of precedence read at step S213 from a time constant table, which is provided in advance.

The time constant here represents a time period to elapse before the initiator of interest that has once given a request of log-in and received a response of failed log-in outputs another request of log-in. In the arrangement of the embodiment, the target specifies a timing of re-request of log-in to determine a time when the initiator of interest, which has just given the request of log-in and received the response of failed log-in, should output another request of log-in. The time constant is here given to the initiator of interest as the timing of re-request of log-in.

In this embodiment, a predetermined relationship is set between the time constant and the ordinal number of precedence 'n' allocated to the initiator of interest that has given a request of log-in (that is, the ordinal number of precedence in the queue). The management agent ME1 provides in advance the time constant table representing this relationship. FIG. 7 shows an exemplified time constant table included in the management agent ME1.

At step S214, the management agent ME1 reads the time constant mapped to the allocated ordinal number of precedence 'n' from this time constant table. Here the ordinal number of precedence 'n' read at step S213 is equal to '1', so that 't1' mapped to n=1 is read as the time constant from the time constant table shown in FIG. 7.

As shown in FIG. 5, the management agent ME1 subsequently sends the status packet, which is set to the log-in error status, to the initiator I1 that has just given the request of log-in at step S216. The log-in error status represents a response of failed log-in. At this moment, the management agent ME1 sends the status packet including the log-in error status as well as the time constant 't2' read at step S214 as shown in FIG. 5. The management agent ME1 accordingly specifies the timing of re-request of log-in to determine the time when the initiator I1, which has just given the request of log-in, should output another request of log-in.

After completion of the processing at step S216, the management agent ME1 again stands by for the input of another log-in packet at step S204.

Referring back to the flowchart of FIG. 3, the controller C1 of the initiator I1 receives the status packet sent from the target T1 and reads the status specified in the status packet at step S106. The controller C1 then determines whether or not the input status is the log-in error status, which represents failed log-in, at step S108. At this moment, the input status is the log-in error status representing failed log-in. The controller C1 accordingly executes the processing of and after step S110, in order to give another request of log-in to the target T1.

The controller C1 reads the time constant included in the received status packet at step S110, and subsequently determines at step S112 whether or not a time period specified by the input time constant has elapsed since the previous output of the log-in packet to the target T1 at step S102. The time constant input at this moment is equal to 't1'. It is accordingly determined whether or not the time period 't1' has elapsed since the previous request of log-in. In the case where the time period 't1' has not yet elapsed, the controller C1 waits for the elapse of the time period 't1'. In the case where the time period 't1' has already elapsed, on the other hand, the program returns to step S102, at which the controller C1 again outputs the log-in packet to the target T1. Namely the initiator I1 sends a second request of log-in to the target T1 after the time period 't1' has elapsed since the output of the first request of log-in as shown in FIG. 5. In this manner, the controller C1 outputs another request of log-in to the target T1, based on the timing of re-request of log-in specified as the time constant by the target T1.

In the event that other initiators I2 and I3 respectively give a request of log-in to the target T1 in the time period between the output of the first request of log-in and the output of the second request of log-in by the initiator I1, the program follows the series of the processing that is similar to the processing discussed above with regard to the initiator I1.

At step S102, the controller C2 of the initiator I2 and the controller C3 of the initiator I3 respectively output the log-in packet, which includes a request of log-in and the GUID intrinsic to the initiator, to the target T1 at the timings shown in FIG. 5. The management agent ME1 of the target T1 receives the log-in packet at the respective timings shown in FIG. 5 at step S204, reads the GUID included in the received log-in packet at step S206, and determines whether or not the input GUID has already been registered in the queue at step S208. At this moment, both the requests of log-in from the initiators I2 and I3 are the first requests of log-in. Neither of the read GUIDs has thus been registered yet in the queue as shown in FIG. 6D. The management agent ME1 then adds the read GUID to the current end of the queue at step S218. More concretely, the GUID 'I1' of the initiator I1 has already been registered at the address n=1 in the queue as shown in FIG. 6D. At the time point when receiving the request of log-in from the initiator I2, the management agent ME1 registers the currently read GUID 'I2' of the initiator I2 at the address n=2 as shown in FIG. 6E. At the subsequent time point when receiving the request of log-in from the initiator I3, the management agent ME1 registers the currently read GUID 'I3' of the initiator I3 at the address n=3 as shown in FIG. 6F.

At either of the time points, the initiator I0 has already logged in the logical unit LUN1. The management agent ME1 accordingly determines that the number of initiators 'p' that currently log in reaches the allowable number of simultaneous log-in '1' at steps S210 and S212, and reads the ordinal number of precedence 'n' allocated to the GUID of the initiator of interest from the queue at step S213. The queue has the state shown in FIG. 6E when the management agent ME1 receives the request of log-in from the initiator I2. Since the GUID of the initiator I2 has been registered at the address n=2 in the queue, the management agent ME1 reads the ordinal number of precedence 'n' equal to '2' at step S213. The queue has the state shown in FIG. 6F when the management agent ME1 receives the request of log-in from the initiator I3. Since the GUID of the initiator I3 has been registered at the address n=3 in the queue, the management agent ME1 reads the ordinal number of precedence 'n' equal to '3' at step S213. The management agent ME1 subsequently reads the time constant mapped to each ordinal number of precedence 'n' from the time constant table shown in FIG. 7 at step S214. More concretely, 't2' mapped to n=2 is read as the time constant of the initiator I2, whereas 't3' mapped to n=3 is read as the time constant of the initiator I3.

In this embodiment, the shorter time constant is mapped to the higher ordinal number of precedence 'n', and the longer time constant to the lower ordinal number of precedence 'n' as shown in FIG. 7. Here the time constant 't1' mapped to the ordinal number of precedence 'n=1' is set to the reference value. The time constant 't2' mapped to n=2 is twice the reference value 't1'. The time constant 't3' mapped to n=3 is four times the reference value 't1'. The time constant 't4' mapped to n=4 is eight times the reference value 't1'. Namely the time constant 't1' mapped to n=i is $2^i$ times the reference value 't1'. Specification of the too long time constant, however, does not have any significant effects. The time constant 't7' mapped to the relatively low ordinal number of preference 'n=7' is thus set equal to the time constant 't6' (this is 32 times the reference value 't1') mapped to the ordinal number of precedence 'n=6'.

At subsequent step S216, the management agent ME1 sends the status packet including the log-in error status and the time constant to the initiators I2 and I3, which have just given the request of log-in, at the respective timings shown in FIG. 5. The controller C2 of the initiator I2 and the controller C3 of the initiator I3 then respectively receive the status packet at the timings shown in FIG. 5 at step S104, read the status included in the received status packet at step S106, and determine whether or not the input status is the log-in error status at step S108. In this case, the input status is the log-in error status, so that the controllers C2 and C3 subsequently read the time constant from the status packet at step S110. More concretely, the controller C2 reads the time constant 't2', and the controller C3 reads the time constant 't3'. The controller C2 accordingly outputs the log-in packet again to the target T1 after the time period 't2' has elapsed since the previous request of log-in at steps S112 and S102. In a similar manner, the controller C3 outputs the log-in packet again to the target T1 after the time period 't3' has elapsed since the previous request of log-in at steps S112 and S102. Namely the initiator I2 sends a second request of log-in to the target T1 after the time period 't2' has elapsed since the output of the first request of log-in, whereas the initiator I3 sends a second request of log-in to the target T1 after the time period 't3' has elapsed since the output of the first request of log-in as shown in FIG. 5.

In this manner, the initiators I1 through I3 respectively output the second and subsequent request of log-in to the target T1. In this case, the GUIDs read from the respective log-in packets have already been registered in the queue. The management agent ME1 of the target T1 accordingly skips the processing of step S218, based on the determination of step S208, and proceeds to the processing of step S210.

In this embodiment, as shown in FIG. 5, after the last initiator I3 outputted the first request of log-in, no initiators other than the initiators I1 through I3 newly give a request of log-in to the target T1 until the initiator I0, which has gained the log-in, logs out. The queue included in the management agent ME1 accordingly keeps the state of FIG. 6F unchanged. No change is thus made with regard to the ordinal numbers of precedence allocated to the GUIDs of the respective initiators I1 through I3 registered in the queue. In response to the second and subsequent requests of log-in from the initiators I1 through I3, the management agent ME1 accordingly sends the status packet including the time constant identical with the previously output time constant to the initiator of interest that has just given the request of log-in. The initiators I1 through I3 respectively output another request of log-in to the target T1 at the timings specified by the time constants identical with the previous time constants as shown in FIG. 5.

In the case where the initiator I0 has already logged in the logical unit LUN1, the technique of the embodiment assigns the shorter time period between one request of log-in and a next request of log-in (that is, the shorter time constant) to the prior initiator that outputs the first request of log-in at the earlier timing. Namely the prior initiator outputs a greater number of requests of log-in per unit time. More concretely, the ratio of the time constants of the initiators I1, I2, and I3 is 1 to 2 to 4 as clearly understood from FIG. 7. The ratio of the number of requests of log-in output per unit time from the initiators I1, I2, and I3 is accordingly 4 to 2 to 1.

In the event that the initiator I0 that has gained the log-in logs out at an arbitrary timing, the initiator that gives the request of log-in at the earliest timing after the log-out manages to log in the logical unit LUN1. There is a good chance that the initiator that outputs the greater number of requests of log-in per unit time outputs the request of log-in at the earliest timing after the log-out. Namely there is a high probability that the initiator I1 next logs in the logical unit LUN1. The technique of the present invention thus practically ensures that the initiator that outputs the first request of log-in first to the target T1 gains the log-in first.

In the event that the initiator I0 outputs a request of log-out to the target T1 at the timing shown in FIG. 5, the program executes the series of the processing discussed below. When the data transmission carried out between the controller C0 of the initiator I0 and the fetch agent FE1 of the target T1 is concluded, the controller C0 sends a log-out packet to the target T1. The log-out packet includes a request of log-out for requiring the target T1 to accept a log-out and the GUID of the initiator I0 as shown in FIG. 5.

Figure 8:
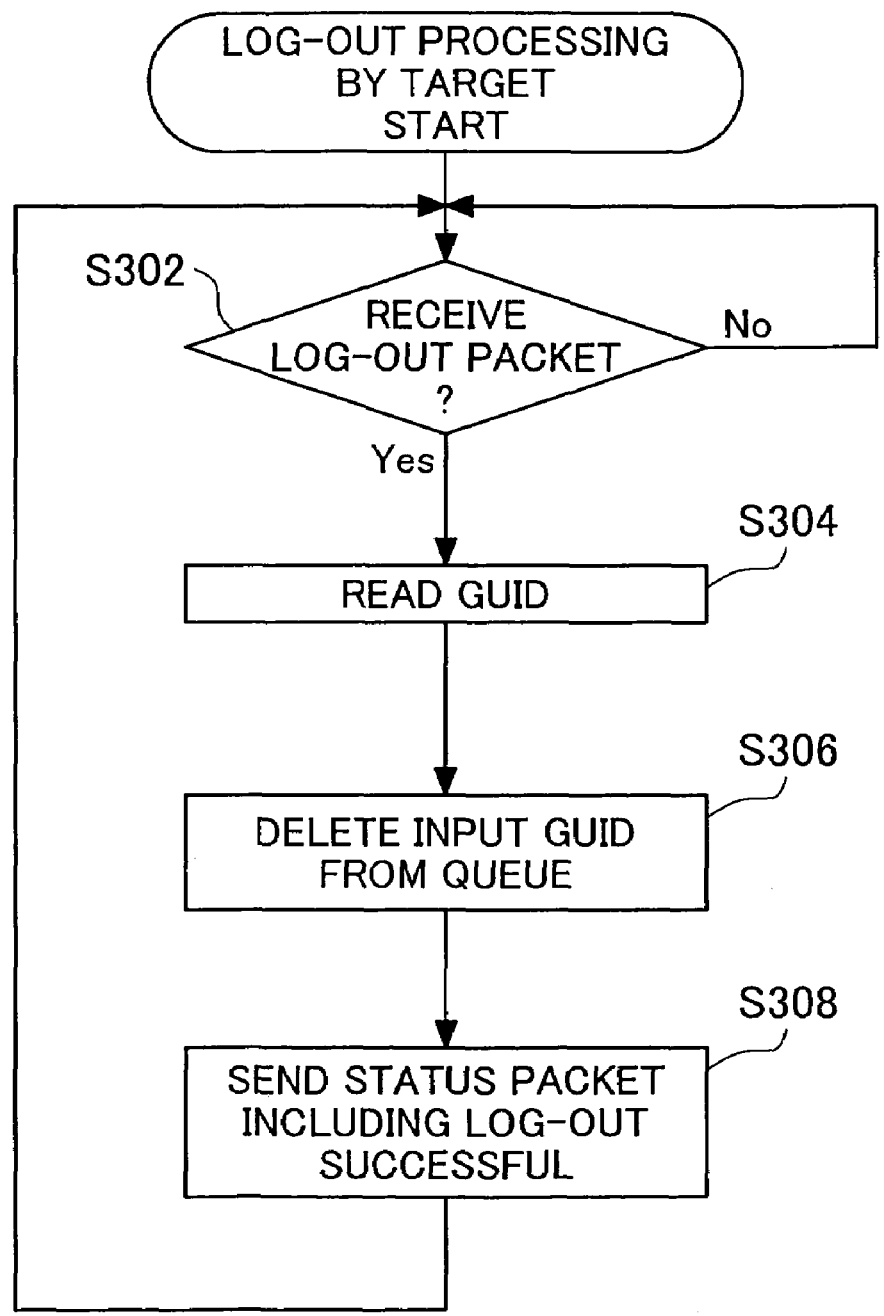
FIG. 8 is a flowchart showing a processing routine of log-out executed by the target shown in FIG. 1.

In the meantime, the target T1 carries out the log-out processing. FIG. 8 is a flowchart showing a processing routine of log-out executed by the target shown in FIG. 1.

The management agent ME1 of the target T1 stands by for the input of a log-out packet at step S302. When receiving a packet, the management agent ME1 determines whether or not the input packet includes a request of log-out. In the case where the request of log-out is included in the input packet, the management agent ME1 identifies the input packet as a log-out packet and proceeds to the processing of step S304.

At step S304, the management agent ME1 reads the GUID included in the input log-out packet. At this moment, the read GUID is 'I0', so that the management agent ME1 determines that the input log-out packet has been sent from the initiator I0.

The management agent ME1 subsequently compares the GUID registered at the address n=0 in the queue, that is, the GUID of the initiator that has gained the log-in, with the GUID read at step S304. When the two GUIDs are identical with each other, the management agent ME1 deletes the registered GUID from the queue at step S306. In this case, the queue has the state shown in FIG. 6F, where 'I0' is registered at the address n=0 as the GUID of the initiator that has gained the log-in. The GUID read at step S304 is also 'I0' and identical with the registered GUID. The management agent ME1 then deletes the GUID 'I0' registered at the address n=0 as shown in FIG. 6G.

At subsequent step S308, the management agent ME1 sends the status packet, which is set to a log-out successful status, to the initiator I0 that has just given the request of log-out as shown in FIG. 5. The log-out successful status represents a response of accepted log-out.

After completion of the processing at step S308, the management agent ME1 again stands by for the input of another log-out packet at step S302.

By the series of the processing discussed above, the initiator I0 that has gained the log-in logs out of the logical unit LUN1 of the target T1.

In the event that the initiator I1 gives a request of log-in to the target T1 at the timing shown in FIG. 5 after the initiator I0 has logged out of the logical unit LUN1, the program follows the series of the processing discussed below.

The initiator I1 and the target T1 carry out the series of the log-in processing, which is substantially similar to the series of the processing executed when the initiator I0 logs into the logical unit LUN1 of the target T1, except the processing of and after step S210 executed by the target T1.

The management agent ME1 reads the number of initiators 'p' that currently log in the logical unit LUN1 at step S210. At this moment, the GUID registered at the address n=0 in the queue has been deleted as discussed previously and shown in FIG. 6G. The number of initiators 'p' read here is accordingly equal to '0'.

At subsequent step S212, the management agent ME1 compares the input number of initiators 'p' with the predetermined allowable number of simultaneous log-in '1' of the logical unit LUT1. In this case, the number of initiators 'p' that currently log in does not reach the predetermined allowable number of simultaneous log-in '1'. As shown in FIG. 5, the management agent ME1 accordingly sends the status packet set to the log-in successful status, which represents the response of accepted log-in, to the initiator I1 that has just given the request of log-in at step S220. The management agent ME1 then shifts all the GUIDs registered in the queue at step S222. In this example, the GUID of the initiator I1, the GUID of the initiator I2, and the GUID of the initiator I3 are respectively registered at the addresses n=1, n=2, and n=3 in the queue as shown in FIG. 6G. The concrete procedure of step S222 thus first shifts the GUID of the initiator I1 from the address n=1 to the vacant address n=0. Namely the GUID of the initiator I1 that has just output the request of log-in is shifted to the address n=0, which represents the log-in state. The procedure then shifts the GUIDs of the initiators I2 and I3 registered at the addresses n=2 and n=3 respectively to the upper addresses by one. The queue accordingly has the state shown in FIG. 6H.

In this manner, the initiator I1, which outputted the request of log-in at the earliest timing after the log-out of the initiator I0, has managed to log in the logical unit LUN1 of the target T1.

In the event that the initiators I2 and I3 respectively output the request of log-in to the target T1 at the timings shown in FIG. 5 after the initiator I1 has managed to log in, the program follows the series of the processing discussed below.

In this case, the initiators I2 and I3 and the target T1 carry out the series of the processing, which is substantially similar to the processing executed when the initiators I2 and I3 outputted the previous request of log-in to the target T1, except some details.

In the log-in processing by the target T1, the management agent ME1 reads the ordinal number of precedence 'n' allocated to the GUID of the initiator of interest, which has just output the request of log-in, from the queue at step S213. Here the queue has the state shown in FIG. 6H. The GUID of the initiator I2, which was registered at the address n=2 in the previous cycle of the processing, is currently registered at the address n=1, so that the ordinal number of precedence 'n' read here with regard to the initiator I2 is equal to '1'. In a similar manner, the GUID of the initiator I3, which was registered at the address n=3 in the previous cycle of the processing, is currently registered at the address n=2, so that the ordinal number of precedence 'n' read here with regard to the initiator I3 is equal to '2'. Namely both the initiators I2 and I3 have the higher ordinal numbers of precedence 'n' than those read in the previous cycle of the processing.

At subsequent step S214, the management agent ME1 reads the time constants mapped to the respective ordinal numbers of precedence 'n' from the time constant table shown in FIG. 7. Here the time constant 't1' mapped to 'n=1' is read with regard to the initiator I2, and the time constant 't2' mapped to 'n=2' is read with regard to the initiator I3. The time constant of the initiator I2 has accordingly changed from 't2' to 't1', whereas the time constant of the initiator I3 has changed from 't3' to 't2'. Namely both the initiators I2 and I3 have the time constants shortened to the respective halves.

At subsequent step S216, the management agent ME1 sends the status packet including the log-in error status and the time constant to the initiators I2 and I3, which have just given the request of log-in, at the respective timings shown in FIG. 5. The controller C2 of the initiator I2 and the controller C3 of the initiator I3 then respectively receive the status packet at the timings shown in FIG. 5 at step S104 and read the time constant from the status packet at step S110. At this moment, the controller C2 reads the time constant 't1' and the controller C3 reads the time constant 't2'. The controller C2 accordingly outputs the log-in packet again to the target T1 after the time period 't1' has elapsed since the previous request of log-in at steps S112 and S102. In a similar manner, the controller C3 outputs the log-in packet again to the target T1 after the time period 't2' has elapsed since the previous request of log-in at steps S112 and S102.

The time periods between one request of log-in and a next request of log-in (that is, the time constants) set for the initiators I2 and I3 after the log-in of the initiator I1 are respectively shortened to the halves the time periods before the log-in of the initiator I1. Namely the number of requests of log-in output to the target T1 per unit time is doubled with regard to both the initiators I2 and I3. This arrangement enables the initiator that has waited for the next log-in to output the request of log-in at the early timing when the initiator I1 that has gained the log-in logs out at an arbitrary timing.

In this manner, the initiators I2 and I3 have the shorter time constants and output the greater numbers of requests of log-in per unit time after the log-in of the initiator I1 than those before the log-in of the initiator I1. The initiator I2 that outputted the first request of log-in earlier than the initiator I3, however, still has the shorter time constant and outputs the greater number of requests of log-in per unit time than the initiator I3. When the initiator I1 that has gained the log-in logs out at an arbitrary timing, there is a good chance that the initiator I2, which outputs the greater number of requests of log-in per unit time, gives a next request of log-in at the earlier timing. Namely there is a high probability that the initiator I2 next logs in the logical unit LUN1.

(D) Supplement

As described previously, any of the respective initiators I0 through I3 sends the log-in packet or the log-out packet to the target T1, and the target T1 sends the status packet to any of the initiators I0 through I3. These operations are discussed more in detail.

Referring back to FIG. 1, the respective initiators I0 through I3 have the common memories SM0 through SM3. Any one of the initiators I0 through I3 sends the log-in packet or the log-out packet to the target T1 in the following manner. Any one of the initiators I0 through I3, that is, the initiator of interest, first locates the data of the log-in packet or the log-out packet, which are to be output to the target T1, in the form of a specific data structure called a management ORB as shown in FIG. 1, on the corresponding one of the respective common memories SM0 through SM3. The initiator of interest then sends a pointer representing an address on the common memory, on which the specific data structure is placed, to the management agent ME1 of the target T1 via the IEEE1394 bus B1. The management agent ME1 of the target T1 receives the pointer, gains access to the common memory of the initiator of interest, which has just sent the pointer, via the IEEE 1394 bus B1, and takes in the management ORB placed at the address specified by the pointer, so as to receive the data of the log-in packet or the log-out packet. In this manner, any of the initiators I0 through I3 sends the log-in packet or the log-out packet to the target T1.

In response to the input of the log-in packet or the log-out packet, the target T1 sends the status packet to any of the initiators I0 through I3, that is, the initiator of interest. The log-in packet or the log-out packet sent from the initiator of interest includes the pointer, which specifies the address on the common memory of the initiator, in addition to the request of log-in or log-out and the GUID. When receiving the log-in packet or the log-out packet, the management agent ME1 of the target T1 reads the pointer included in the input packet, gains access to the common memory of the initiator of interest via the IEEE1394 bus B1, and writes the data of the status packet into STATUS_FIFO specified by the pointer. In this manner, the target T1 remote writes the status packet into any of the initiators I0 through I3.

After the initiator of interest logs into the logical unit LUN1 of the target T1, the data transmission between the initiator of interest and the fetch agent FE1 of the target T1 is carried out in a similar manner. In the case of the data transmission between the initiator and the fetch agent FE1, however, the initiator places the data on its own common memory in a specific data form called a normal ORB as shown in FIG. 1, instead of the management ORB discussed above.

As described previously, according to the technique of the embodiment, when the initiator I0 that has gained the log-in logs out at an arbitrary timing, there is a good chance that the initiator I1, which outputs the greatest number of requests of log-in per unit time, outputs a next request of log-in at the earliest timing. In the example of FIG. 5, after the initiator I0 logs out, the initiator I1 outputs the request of log-in to the target T1 at the earliest timing. In the actual state, however, there is still some chance that the initiator I2 or I3 outputs the request of log-in to the target T1 at the earliest timing after the log-out of the initiator I0. This depends upon the log-out timing of the initiator I0. For example, it is assumed that the initiator I2 or I3 gives the request of log-in between the previous request of log-in and the next request of log-in by the initiator I1. In the case where the initiator I0 logs out after the previous request of log-in by the initiator I1 and before the next request of log-in by the initiator I2 or I3, the initiator I2 or I3 gives the request of log-in to the target T1 at the earliest timing after the log-out.

In such cases, the initiator I2 or I3 that outputs the request of log-in at the earliest timing after the log-out of the initiator I0 manages to log into the logical unit LUN1 of the target T1. Namely the initiator I2 or I3 that outputted the first request of log-in later than the initiator I1 gains the log-in, prior to the initiator I1.

In this case, the processing of step S222 in the series of the log-in processing by the target T1 is carried out in the following manner. At step S222, the management agent ME1 shifts all the GUIDs registered in the queue. In this example, after the initiator I0 logs out, the initiator I2 outputs the request of log-in to the target T1 at the earliest timing to gain the log-in.

Here the queue has the state shown in FIG. 6G. The GUID of the initiator I1, the GUID of the initiator I2, and the GUID of the initiator I3 are respectively registered at the addresses n=1, n=2, and n=3 in the queue. Under such circumstances, the management agent ME1 shifts the GUID of the initiator I2, which has just given the request of log-in, from the address n=2 to the address n=0, which represents the log-in state. The management agent ME1 then shifts the GUID of the initiator I3 from the address n=3 to the upper address by one, that is, the vacant address n=2. The GUID of the initiator I1 is kept unchanged.

In this case, the initiator I2 that outputted the first request of log-in later gains the log-in, prior to the initiator I1 that outputted the first request of log-in earlier. There is, however, no change in ordinal number of precedence 'n' allocated to the GUID of the initiator I1 in the queue. After the initiator I2 has gained the log-in, the initiator I1 still has the shortest time period between one request of log-in and a next request of log-in (that is, the shortest time constant) and outputs the greatest number of requests of log-in per unit time. There is accordingly still a good chance that the initiator I1 outputs the next request of log-in at the earliest timing to gain the next log-in after the initiator I2 that has gained the log-in logs out at an arbitrary timing.

The following problem may, however, arise in the processing discussed above. Here it is assumed that the initiator I1 that outputted the first request of log-in at the earlier timing stops repeatedly giving the request of log-in because of some reason, for example, detachment of the initiator I1 from the IEEE1394 bus B1. As a result of the above processing at step S222, the GUID of the initiator I1 remains at the address n=1 in the queue, which has the ordinal number of precedence 'n' equal to '1'. The initiator I3, whose GUID is shifted from the address n=3 to the address n=2, has the ordinal number of precedence 'n' equal to '2'. While the initiator I1 stops outputting the request of log-in to the target T1, 't2' mapped to the ordinal number of precedence 'n=2' is still used as the time constant of the initiator I3. This undesirably lengthens the timing of output of the request of log-in from the initiator I3 to the target T1.

For the purpose of improvement, the processing of step S222 discussed above may be replaced by a different process discussed below.

Here the queue has the state shown in FIG. 6G. The management agent ME1 shifts the GUID of the initiator I2, which has just given the request of log-in, from the address n=2 to the address n=0, which represents the log-in state, and deletes the GUID of the specific initiator that has the higher ordinal number of precedence 'n' than that allocated to the GUID of the initiator I2 (that is, the GUID of the initiator I1) from the queue. The management agent ME1 then shifts the GUID of the initiator I3 that has the lower ordinal number of precedence 'n' than that allocated to the GUID of the initiator I2 from the address n=3 to the upper address by two, that is, the vacant address n=1. This process solves the problem discussed above.

In accordance with another available procedure, the management agent ME1 detects the timing of repeated request of log-in output from each initiator. When no further request of log-in is given by the initiator of interest after elapse of a predetermined time period, the management agent ME1 deletes the GUID of the initiator from the queue.

The present invention is not restricted to the above embodiment or its modifications, but there may be many other modifications, changes, and alterations without departing from the scope or spirit of the main characteristics of the present invention.

In the embodiment discussed above, four initiators and one target are connected to the IEEE1394 bus B1 as shown in FIG. 1. The technique of the present invention is, however, not restricted to such numbers. In the case where two or more targets are connected to the IEEE1394 bus B1, the series of the processing discussed above is executed by each target.

In the embodiment discussed above, the target T1 has only one logical unit LUN1. The target may, however, have two or more logical units. In this case, each initiator independently logs in each logical unit. The logical unit LUN1 has the allowable number of simultaneous log-in set equal to '1' in the above embodiment. The allowable number of simultaneous log-in may, however, be set equal to any value of not less than 2. In the latter case, the processing of step S212 in the series of the log-in processing by the target shown in the flowchart of FIG. 4 should be modified according to the preset allowable number of simultaneous log-in.

In the embodiment discussed above, the initiators are the computers and the target is the printer. The technique of the present invention is, however, not restricted to such devices. The initiator may be a scanner or any suitable device other than the computer. The target may also be any suitable device other than the printer. In one example, an interface switching device may be set to the target. In this case, the target only plays the role of switching between the IEEE1394 bus and an existing interface, which is connected with a scanner or a printer.

The scope and spirit of the present invention are limited only by the terms of the appended claims.

What is claimed is:

1. A logged-in device that is logged in by a plurality of specific devices via a predetermined communication path, the logged-in device comprising:
 a response unit that gives a response of failed log-in to one specific device of interest, which has just output a request of log-in, when a number of specific devices that currently log in the logged-in device reaches a predetermined allowable number of simultaneous log-ins; and
 a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest,
 the re-request timing specification unit including:
  a precedence designation unit that allocates an ordinal number of precedence to the specific device of interest, which has just output the request of log-in; and
  a re-request timing determination unit that determines the timing of re-request of log-in with regard to the specific device of interest, based on the ordinal number of precedence allocated to the specific device of interest.

2. A logged-in device that is logged in by a plurality of specific devices via a predetermined communication path, the logged-in device comprising:
 a response unit that gives a response of failed log-in to one specific device of interest, which has just output a request of log-in, when a number of specific devices that currently log in the logged-in device reaches a predetermined allowable number of simultaneous log-ins; and
 a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest,
 the re-request timing specification unit including:
  a precedence designation unit that allocates an ordinal number of precedence to the specific device of interest, which has just output the request of log-in, and
  a re-request timing determination unit that determines the timing of re-request of log-in with regard to the specific device of interest, based on the ordinal number of precedence allocated to the specific device of interest,
 the precedence designation unit allocating ordinal numbers of precedence to the plurality of specific devices in a sequence of outputting first requests of log-in.

3. A logged-in device that is logged in by a plurality of specific devices via a predetermined communication path, the logged-in device comprising:
 a response unit that gives a response of failed log-in to one specific device of interest, which has just output a request of log-in, when a number of specific devices that currently log in the logged-in device reaches a predetermined allowable number of simultaneous log-ins; and
 a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest,
 the re-request timing specification unit including:
  a precedence designation unit that allocates an ordinal number of precedence to the specific device of interest, which has just output the request of log-in, and
  a re-request timing determination unit that determines the timing of re-request of log-in with regard to the specific device of interest, based on the ordinal number of precedence allocated to the specific device of interest, the re-request timing determination unit assigning a shorter timing of re-request of log-in to a specific device having a higher ordinal number of precedence.

4. A logged-in device that is logged in by a plurality of specific devices via a predetermined communication path, the logged-in device comprising:
 a response unit that gives a response of failed log-in to one specific device of interest, which has just output a request of log-in, when a number of specific devices that currently log in the logged-in device reaches a predetermined allowable number of simultaneous log-ins; and
 a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest, the re-request timing specification unit including:
a precedence designation unit that allocates an ordinal number of precedence to the specific device of interest, which has just output the request of log-in, and a re-request timing determination unit that determines the timing of re-request of log-in with regard to the specific device of interest, based on the ordinal number of precedence allocated to the specific device of interest, the logged-in device including at least one logical unit, which is independently logged in by each of the plurality of specific devices, the response unit giving a response of failed log-in with regard to a certain logical unit to one specific device of interest, which has just output a request of log-in to the certain logical unit, when a number of specific devices that currently log in the certain logical unit reaches an allowable number of simultaneous log-ins preset for the certain logical unit, and the re-request timing specification unit specifying a timing of re-request of log-in to determine a time when the specific device of interest, which has just output the request of log-in to the certain logical unit, should output another request of log-in to the certain logical unit, and assigning specified timing of re-request to the specific device of interest, when the response unit gives the response of failed log-in.

5. A logged-in device that is logged in by a plurality of specific devices via a predetermined communication path, the logged-in device comprising:

a response unit that gives a response of failed log-in to one specific device of interest, which has just output a request of log-in, when a number of specific devices that currently log in the logged-in device reaches a predetermined allowable number of simultaneous log-ins; and a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest, the re-request timing specification unit including:
a precedence designation unit that allocates an ordinal number of precedence to the specific device of interest, which has just output the request of log-in, and a re-request timing determination unit that determines the timing of re-request of log-in with regard to the specific device of interest, based on the ordinal number of precedence allocated to the specific device of interest, the plurality of specific devices being adjusted not to output the request of log-in simultaneously via the predetermined communication path.

6. A logged-in device that is logged in by a plurality of specific devices via a predetermined communication path, the logged-in device comprising:

a response unit that gives a response of failed log-in to one specific device of interest, which has just output a request of log-in, when a number of specific devices that currently log in the logged-in device reaches a predetermined allowable number of simultaneous log-ins; and a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest, the re-request timing specification unit including:
a precedence designation unit that allocates an ordinal number of precedence to the specific device of interest, which has just output the request of log-in, and a re-request timing determination unit that determines the timing of re-request of log-in with regard to the specific device of interest, based on the ordinal number of precedence allocated to the specific device of interest, the predetermined communication path including an IEEE1394 bus.

7. A logged-in device that is logged in by a plurality of specific devices via a predetermined communication path, the logged-in device comprising:

a response unit that gives a response of failed log-in to one specific device of interest, which has just output a request of log-in, when a number of specific devices that currently log in the logged-in device reaches a predetermined allowable number of simultaneous log-ins; and a re-request timing specification unit that specifies a timing of re-request of log-in to determine a time when the specific device of interest, which has just output the request of log-in, should output another request of log-in, and assigns the specified timing of re-request to the specific device of interest, when the response unit gives the response of failed log-in, a predetermined relationship being between the specified timing and the specific device of interest, the re-request timing specification unit including:
a precedence designation unit that allocates an ordinal number of precedence to the specific device of interest, which has just output the request of log-in, and a re-request timing determination unit that determines the timing of re-request of log-in with regard to the specific device of interest, based on the ordinal number of precedence allocated to the specific device of interest, the logged-in device communicating with plurality of specific devices according to an SBP-2 protocol.

8. A method of controlling log-in, so as to enable a plurality of log-in devices to log in at least one logical unit included in a logged-in device via a predetermined communication path, the method comprising:

(a) causing the logged-in device to give a response of failed log-in with regard to a certain logical unit to one log-in device of interest, which has just output a request of log-in to the certain logical unit, when a number of log-in devices that currently log in the certain logical unit reaches an allowable number of simultaneous log-ins preset for the certain logical unit;
(b) causing the logged-in device to specify a timing of re-request of log-in to determine a time when the log-in device of interest, which has just output the request of log-in to the certain logical unit, should output another request of log-in to the certain logical unit, and to assign the specified timing of re-request to the log-in device of interest, when the response of failed log-in is given, a predetermined relationship between the specified timing and the log-in device of interest; and
(c) causing the log-in device of interest to output another request of log-in to the certain logical unit included in the logged-in device at the specified timing of re-request when the log-in device of interest receives the response of failed log-in with regard to the certain logical unit and the specified timing of re-request from the logged-in device,
the step (b) including causing the logged-in device to allocate ordinal numbers of precedence to the plurality of log-in devices in a sequence of outputting first requests of log-in to the certain logical unit, and to assign a shorter timing of re-request of log-in to a log-in device having a higher ordinal number of precedence.

9. A computer program product that causes a computer to carry out a series of logged-in processing, the computer being logged in by a plurality of specific devices via a predetermined communication path, the computer program product comprising:
a first program code that causes the computer to give a response of failed log-in to one specific device of interest, which has just output a request of log-in, when a number of specific devices that currently log in the logged-in device reaches a predetermined allowable number of simultaneous log-ins;
a second program code that causes the computer to specify a timing of re-request of log-in to determine a time when the specific device of interest, which has just output the request of log-in, should output another request of log-in, and to assign the specified timing of re-request to the specific device of interest, when the response of failed log-in is given, a predetermined relationship being between the specified timing and the specific device of interest; and
a computer readable medium, in which the first program code and the second program code are stored,
the second program code including
a program code that causes the computer to allocate ordinal numbers of precedence to the plurality of specific devices in a sequence of outputting first requests of log-in, and to assign a shorter timing of re-request of log-in to a specific device having a higher ordinal number of precedence.

10. A data signal embodied in a carrier, the data signal representing a computer program that causes a computer to carry out a series of logged-in processing, the computer being logged in by a plurality of specific devices via a predetermined communication path, the data signal comprising:
a first program code that causes the computer to give a response of failed log-in to one specific device of interest, which has just output a request of log-in, when a number of specific devices that currently log in the logged-in device reaches a predetermined allowable number of simultaneous log-ins; and
a second program code that causes the computer to specify a timing of re-request of log-in to determine a time when the specific device of interest, which has just output the request of log-in, should output another request of log-in, and to assigning the specified timing of re-request to the specific device of interest, when the response of failed log-in is given, a predetermined relationship between the specified timing and the specific device of interest,
the second program code including
a program code that causes the computer to allocate ordinal numbers of precedence to the plurality of specific devices in a sequence of outputting first requests of log-in, and to assign a shorter timing of re-request of log-in to a specific device having a higher ordinal number of precedence.

11. A computer program that causes a computer to carry out a series of logged-in processing, the computer being logged in by a plurality of specific devices via a predetermined communication path, the computer program comprising:
a first program code that causes the computer to give a response of failed log-in to one specific device of interest, which has just output a request of log-in, when a number of specific devices that currently log in the logged-in device reaches a predetermined allowable number of simultaneous log-ins; and
a second program code that causes the computer to specify a timing of re-request of log-in to determine a time when the specific device of interest, which has just output the request of log-in, should output another request of log-in, and to assign the specified timing of re-request to the specific device of interest, when the response of failed log-in is given, a predetermined relationship being between the specified timing and the specific device of interest,
the second program code including
a program code that causes the computer to allocate ordinal numbers of precedence to the plurality of specific devices in a sequence of outputting first requests of log-in, and to assign a shorter timing of re-request of log-in to a specific device having a higher ordinal number of precedence.

* * * * *